Oct. 29, 1963  R. J. VAN SCHIE  3,108,678
ARTICLE TRANSFER DEVICE FOR CONVEYOR SYSTEMS
Filed Jan. 15, 1962  4 Sheets-Sheet 1

INVENTOR.
Robert J. Van Schie
BY
ATTORNEY.

Oct. 29, 1963  R. J. VAN SCHIE  3,108,678
ARTICLE TRANSFER DEVICE FOR CONVEYOR SYSTEMS
Filed Jan. 15, 1962  4 Sheets—Sheet 2

Fig. 3.A.

INVENTOR.
Robert J. Van Schie
BY
*Otter A. Earl*
ATTORNEY.

Oct. 29, 1963   R. J. VAN SCHIE   3,108,678
ARTICLE TRANSFER DEVICE FOR CONVEYOR SYSTEMS
Filed Jan. 15, 1962   4 Sheets-Sheet 3

INVENTOR.
Robert J. Van Schie
BY
[signature]
ATTORNEY.

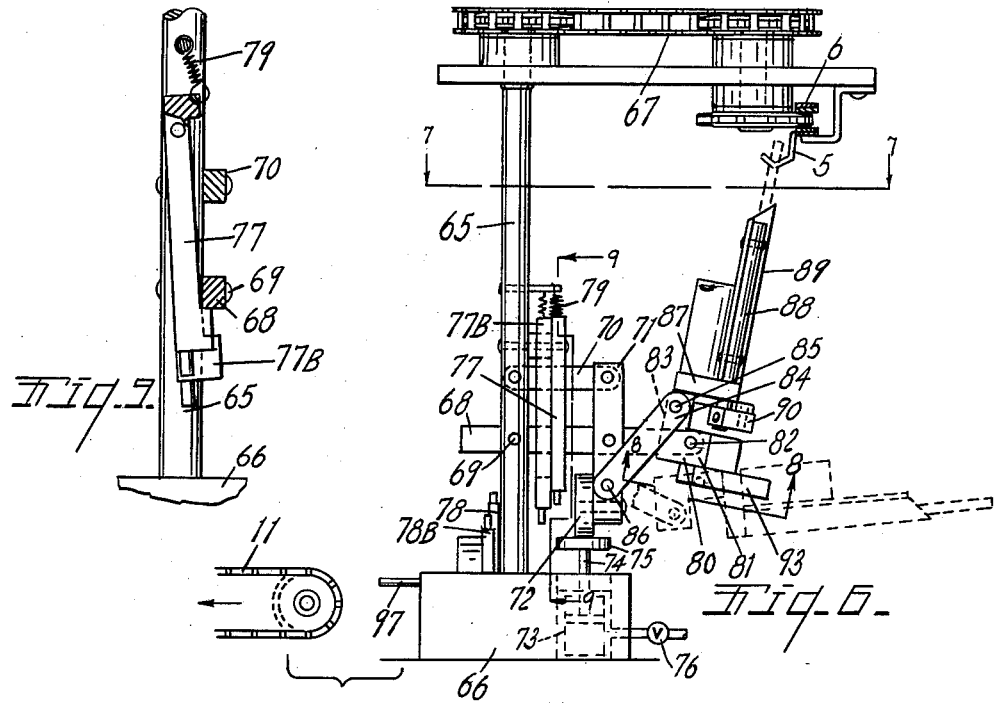
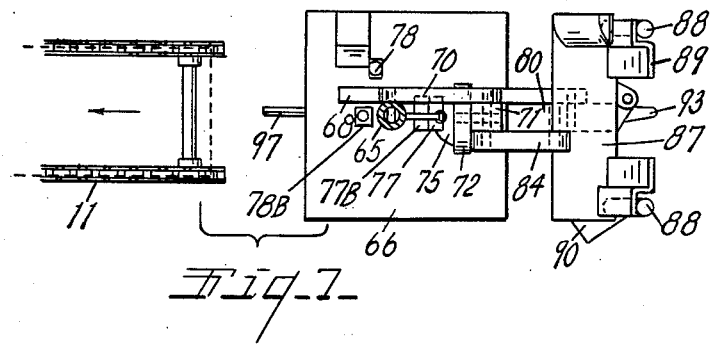
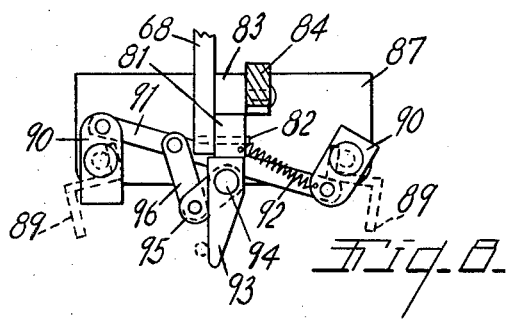
INVENTOR.
Robert J. Van Schie
ATTORNEY.

United States Patent Office 3,108,678
Patented Oct. 29, 1963

3,108,678
ARTICLE TRANSFER DEVICE FOR CONVEYOR SYSTEMS
Robert J. Van Schie, 236 Jean St., Grand Rapids, Mich.
Filed Jan. 15, 1962, Ser. No. 166,112
10 Claims. (Cl. 198—25)

This invention relates to improvements in article transfer device for conveyor systems. The principal objects of this invention are:

First, to provide a novel transfer device which will effectively pick up and disengage an article such as a sheet metal stamping from one conveyor and swing the article and deposit it in supported engagement with a second conveyor for further advance by the second conveyor.

Second, to provide an article transfer mechanism having the foregoing capabilities which will swing the article supporting member in an upwardly directed motion to pick articles off of one conveyor and which will reversely swing the article supporting member downwardly in depositing the article on the second conveyor.

Third, to provide a rotatable article transfer device having an article supporting member which is rotatable through 360° of arc and swingable vertically between a generally horizontal radially projected position and a generally upright radially retracted position.

Fourth, to provide an article transfer device which is swingable through a full circle and has a vertically swingable article supporting member consisting of spaced pivoted side members which can be swung open in one rotated position of the members to drop an article in generally horizontal position from the supporting member.

Fifth, to provide an article transfer device for conveyor systems which is easily adapted by variation in the shape of the article supporting elements thereof to handle various types and shapes of article.

Other objects and advantages of the invention will be apparent from a consideration of the following description and claims. The drawings, of which there are four sheets, illustrate a system of plural conveyors with three modified forms of the transfer device of the invention arranged to transfer articles between the conveyors of the system.

FIG. 3A is a perspective view conventionally illustrating the type of article which the transfer mechanism is capable of handling.

FIG. 6 is a fragmentary vertical cross sectional view taken generally along the plane of the line 6—6 in FIG. 1 and illustrating the third form of transfer mechanism in a differently rotated position from that shown in FIG. 1.

FIG. 7 is a fragmentary horizontal cross sectional view taken along the plane of the line 7—7 in FIG. 6.

FIG. 8 is a fragmentary cross sectional view taken along the plane of the line 8—8 in FIG. 6 illustrating the article holding trip mechanism of the transfer device.

FIG. 9 is a fragmentary vertical cross sectional view taken along the plane of the line 9—9 in FIG. 6 illustrating the mechanism for supporting and releasing the article support from elevated to depressed position.

Figure 1:
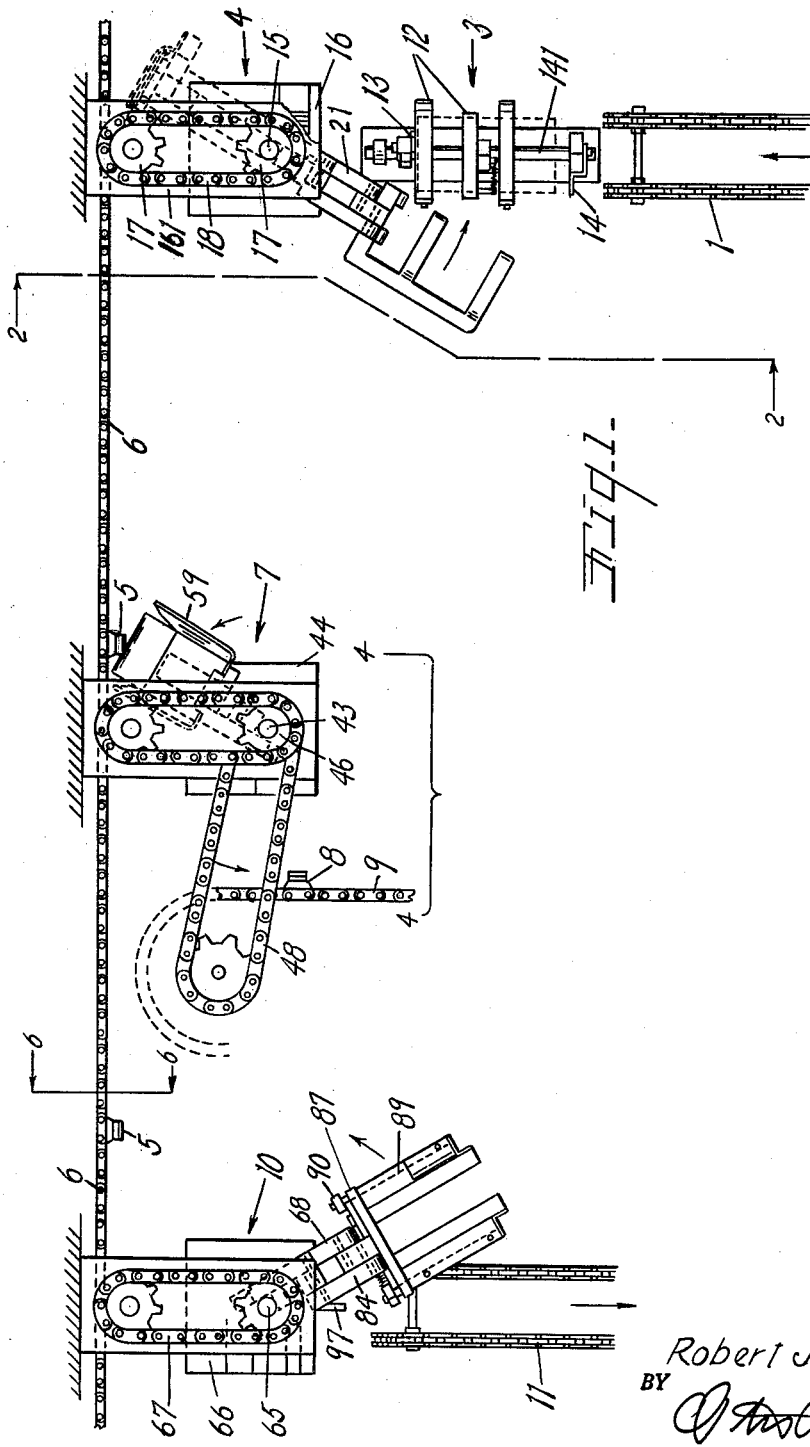
FIG. 1 is a fragmentary top plan view of the conveyor system illustrating four conveyors and three transfer devices, the conveyors are illustrated conventionally to demonstrate the coaction with the transfer devices.

The conveyor system illustrated conventionally in FIG. 1 is demonstrative of possible combinations of conveyors for handling production articles such as sheet metal stampings with the transfer mechanism of the invention. A first conveyor 1 of the flat parallel chain type which will deliver articles such as the rough door stamping shown conventionally at 2 in FIG. 3 in flat position to a transfer stand indicated generally at 3. A first rotatable transfer device indicated generally at 4 will pick up the articles as will be described in greater detail presently and transfer the articles to a suspended position from hooks 5 on an overhead conveyor 6. A second transfer device indicated generally at 7 may be selectively actuated as will be described in detail to remove articles from the conveyor 6 and hooks 5 and transfer the articles still in suspended relation to hooks 8 on a third conveyor 9. Ultimately articles may be advanced by the conveyor 6 to a third form of the transfer device indicated generally at 10 which will pick the articles off of the hooks 5 and transfer them to a horizontal receiving position such as the flat parallel chain conveyor conventionally illustrated at 11. The transfer devices will not necessarily be arranged in the system illustrated and are capable of operating between and in conjunction with various arrangements of conveyors.

Figure 2:
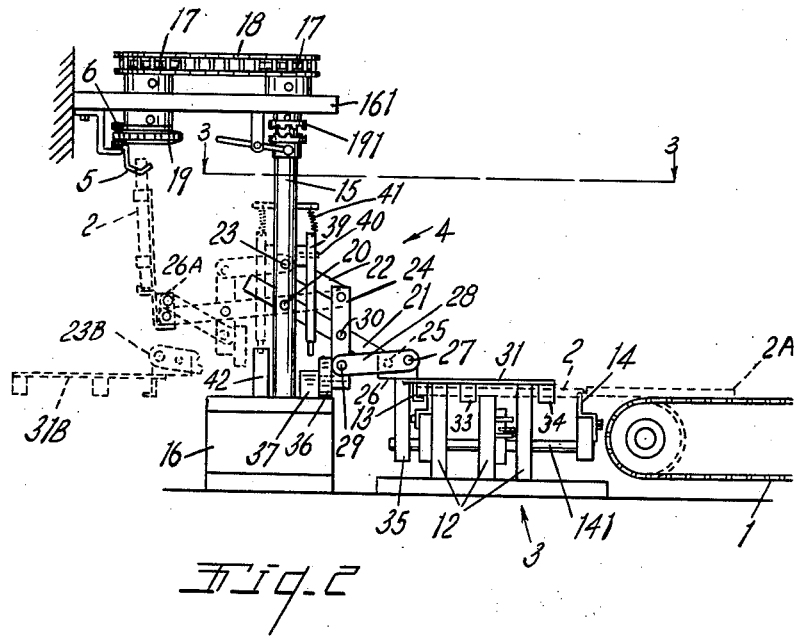
FIG. 2 is a fragmentary side elevational view of a first form of the transfer device the view being taken generally along the plane of the line 2—2 in FIG. 1.
Figure 3:
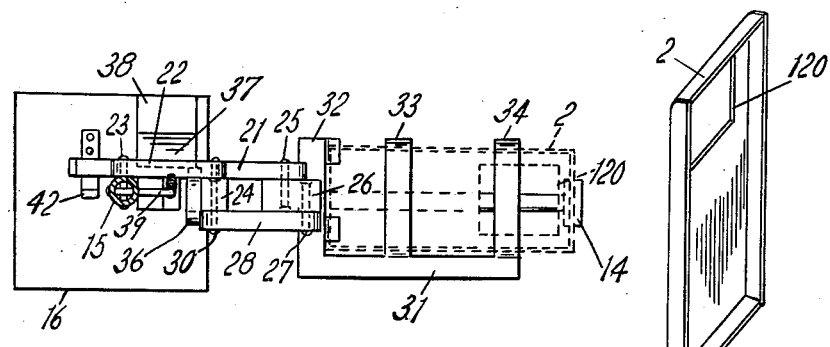
FIG. 3 is a horizontal cross sectional view taken along the plane of the line 3—3 in FIG. 2.

Considering first the structure and operation of the first transfer device 4 and the transfer stand 3, attention is directed to FIGS. 1, 2 and 3. The stand 3 consists of three spaced rails 12 arranged in spaced relation to the end of the conveyor 1 and transversely thereto to receive and support an article 2 in flat position. A stop 13 on the stand locates the position of the article. A rotatable lifter 14 carried on the rock shaft 141 lifts the rear or outer end of the first article and intercepts further articles as at 2A until the stand is empty and ready to receive a second or succeeding article. As indicated in FIG. 3A the articles 2 may be automotive door stampings having window opening 120 therein or they may be other stampings or molded articles having flanges or openings capable of engaging and being supported by the hooks 5 on the conveyor 6. The rails 12 of the transfer stand will, of course, be conformed or shaped to support the articles in the desired position.

The transfer mechanism 4 consists of an upright post 15 rotatably mounted on a pedestal 16 positioned between the conveyor 6 and the transfer stand 3. The upper end of the post 15 is journaled in a suitable overhead support 161 which carries sprockets 17 and a connecting chain 18. The lower sprocket 19 meshes with the chain of conveyor 6 to synchronize the movement of the conveyor 6 to the transfer device and a clutch indicated generally at 191 in FIG. 2 selectively engages the post 15 with the sprockets 17. The synchronizing drive 17—18 is arranged to rotate post 15 in synchronism with the advancing hooks 5.

Secured to the post 15 as by the horizontal pivot 20 is a laterally projecting vertically swingable boom 21 which rotates with the post to project toward and below the hooks 5 as the hooks pass the transfer device. A second laterally projecting link 22 is pivoted on the post 5 by the pivot 23 and connected to the boom 21 by an upright link 24 to provide parallel vertical swinging motion of the link and boom.

Pivotally secured to the outer swinging end of the boom 21 by a horizontal pivot 25 is a block-like article support base member 26. The pivot 27 spaced upwardly on the base member 26 from the pivot 25 connects a tilting link 28 to the base member and the tilting link is pivoted as at 29 to the lower end of the upright link 24 in spaced relationship below the pivot 30 between the boom and the upright link. The result of this arrangement of linkage is that the article support base member 26 is tilted downwardly and outwardly as appears in full lines in FIGS. 1, 2 and 3 when the boom 21 is lowered but is swung upwardly and radially inwardly as indicated by the dotted lines at 26A in FIG. 2 when the boom is raised.

The article support base member 26 carries a cradle-like article support having a side bar 31 and three cross members 32—33 and 34 arranged in E shape. The inner cross bar 32 is secured to the base member 26 for support and swinging motion therewith. The cross bars are downwardly concave to cradle and support the articles 2 in both horizontal and upright position of the article support. The cross members swing between the supporting rails 12 of the transfer stand to pass under an article on the stand. An upright lever 35 on the previously described rock shaft 141 is engaged by the article support base member 26 as the transfer device rotates to retract the stop 14 and condition the transfer stand to receive a succeeding article as an article is carried away by the article support member 31.

The boom 21 is moved vertically during its rotary motion by means of a roller 36 carried on the lower end of the upright 24 and rollingly supported on the pedestal 16. As the article support 31 swings underneath the article 2 on the transfer station the roller 36 engages the inclined face 37 of a lift block 38 and raises the upright link 24 and the boom 21. As previously described the article support base member 26 both raises and tilts upwardly and inwardly to lift the article into generally upright position.

Once elevated the boom 21 is maintained in upright position by a latch 39 pivoted at 40 on the side of the post and urged into supporting engagement with the elevated boom by a spring 41. The latch mechanism is most particularly illustrated in FIG. 9 in conjunction with the transfer device 10, the latch mechanism on all transfer devices being the same.

As the boom and article support rotate now in elevated position the upper edge of the article 2 and the window opening 120 therein is swung into mating relation with the advancing hooks 5 on the conveyor 6 due to the synchronizing action of the drive chain 18. When the boom is extended directly toward the plane of the chain 6, a trip pawl 42 positioned on top of the platform 16 engages the lower end of the latch 39 disengaging the latch from the boom and permitting the boom to fall to the dotted position indicated at 23B in FIG. 2. Lowering motion of the boom causes the article support to simultaneously swing downwardly and outwardly to the dotted position 31B in FIG. 2 and the article 2 remains suspended on the hook 5 for advance by the conveyor 6.

*Second Transfer Device*

Figure 4:
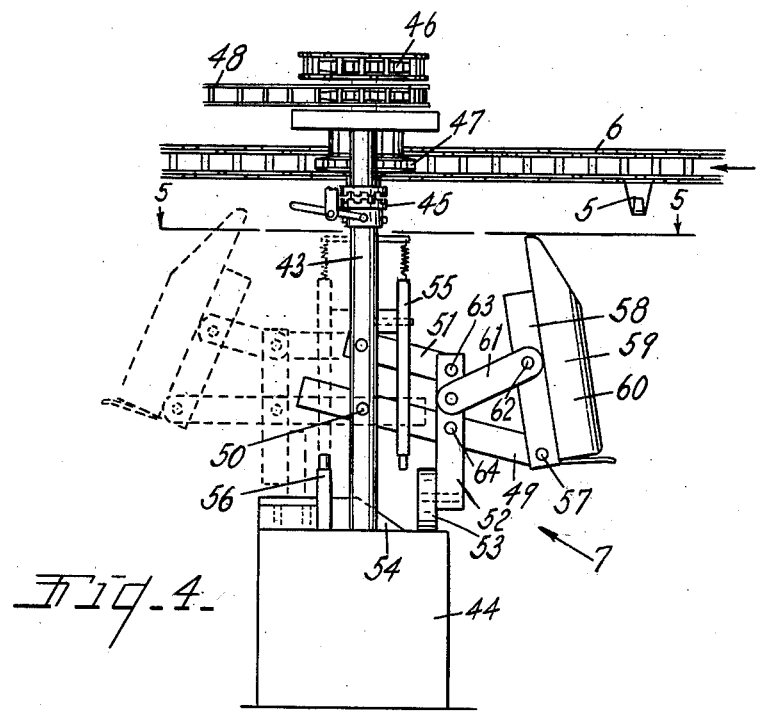
FIG. 4 is a fragmentary side elevational view of the second form of transfer device viewed generally from the plane of the bracket 4—4 in FIG. 1.
Figure 5:
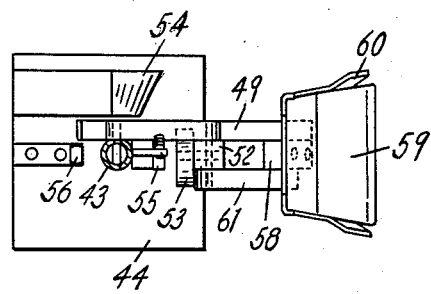
FIG. 5 is a fragmentary horizontal cross sectional view taken along the plane of the line 5—5 in FIG. 4.

The second transfer device appearing in FIGS. 1, 4 and 5 transfers articles suspended on the hooks 5 from the conveyor 6 to the hooks 8 on the conveyor 9. Thus the conveyor 6 becomes a supply conveyor with respect to this transfer device. The device consists of an upright post 43 rotatably mounted on a pedestal 44 and connectable through the clutch conventionally illustrated at 45 to the chain and sprocket mechanism 46 which connects the post to a sprocket 47 driven by the chain 6 to synchronize the rotation of the post with movement of the conveyor. Movement of the receiving conveyor 9 may be synchronized with the transfer and the conveyor 6 by a second synchronizing chain 48.

The post 43 carries a radially projecting boom 49 pivoted for vertical swinging motion on the pivot 50. An upper parallel link 51 is connected to the boom by the upright link 52 and a roller 53 supports the boom and linkage from the surface of the pedestal 44. As the boom converges with the conveyor 6 the roller 53 engages and rises along an inclined block 54 to raise the boom and a latch 55 hooks under the boom to hold it in elevated position. As the boom comes into opposed relation to the conveyor 9 and the hooks 8 thereon, a pawl 56 on the pedestal trips the lower end of the latch to release the boom permitting it to fall to lowered position.

The outer swinging end of the boom 49 is connected by a horizontal pivot 57 to the article support base member 58 which in this case is an upright bar. The base member carries an article support member 59 of outwardly facing L-shaped cross section and having side walls 60 to receive and support articles and lift them off of the hooks 5. The base member 58 is connected by the tilting link 61 and pivots 62 and 63 to the upright link 52 with the pivot 62 spaced above the pivot 57 and with the pivot 63 positioned above the pivotal connection 64 between the boom and the upright link. The action of the boom 49 and linkage 52, 58, 61 is similar to the action of the linkage 21, 24, 28 of the first transfer device except that the swinging motion of the article support base member is not so extreme. In the lowered position of the boom 49, the article support member 59 is generally upright and upon elevation of the boom the support member tilts radially inwardly and downwardly to effectively swing the upper end of the article away from the hook 5 as it is lifted over the hook by raising motion of the support member. A reverse action is, of course, obtained when the boom is lowered opposite the conveyor 9 to lower the article and swing its upper end radially outwardly over the hooks 8 on the receiving conveyor.

*Third Transfer Device*

The third transfer device is illustrated in FIGS. 1 and 6 to 9 in which the conveyor 6 and hooks 5 again constitute a supply source for articles to be transferred to a receiving support such as the flat conveyor 11. Again the transfer device consists of an upright post 65 rotatably supported in the pedestal 66 and driven by a connecting chain and sprocket arrangement 67 to the supply conveyor 6. The post carries a radially projecting boom 68 pivotally supported at 69. An upper parallel link 70 is connected by the upright link 71 to the boom and the lower end of the upright link carries a roller 72 which rolls upon the upper surface of the pedestal. Recessed into the pedestal opposite the conveyor 6 is a fluid actuated cylinder 73 having a piston 74 with a platform 75 on its upper end positioned in the path of the roller 72. Fluid pressure is admitted to the cylinder 73 selectively under the control of a valve 76 to raise the roller and the boom as the boom swings past the conveyor 6. A third latch 77 which is the same as the other latches 55 and 39 engages the boom to hold it in elevated position. A trip pawl 78 engages the bottom end of the latch to deflect the latch from underneath the boom as the boom approaches the receiving support or conveyor 11. A spring 79 biases the latch toward engaged position. As a possible alternative, a second latch 77B may catch the boom at an intermediate level to be released later by the pawl 78B.

The outer swinging end of the boom 68 carries an article support base member 80 of generally L-shaped configuration with a lower and inner arm 81 pivotally connected to the boom at 82. The upper arm 83 is pivotally connected to the inclined tilting link 84 at 85 and the link 84 extends downwardly to a pivot 86 on the upright link 71 positioned below the pivotal connection between the boom and the upright link. The linkage in FIG. 6 is thus similar to the linkage in FIG. 2 to effect almost a 90° vertical swinging motion of the article support base member 80.

The base member 80 supports a transverse plate 87 which constitutes the bottom and inner end of the article support member. Two transversely spaced and radially projecting rods 88 are swivelly supported in the ends of the plate 87 and have opposed inwardly projecting L-shaped supporting fingers 89 secured thereto. At their inner ends behind the plate 87 the rods 88 are provided with crank arms 90 connected by a cross link 91 for equal and opposite rocking of the rods 88 and the support fingers 89. A spring 92 biases the cranks to closed article supporting position of the fingers 89. The inner or lower arm 81 of the base member carries a pawl 93 on the pivot 94 and the pawl 93 is connected by the crank 95 and link 96 to the link 91 so that when the pawl 93 is swung past the pin 97 projecting from the side of the pedestal opposite the conveyor 11 the rods 88 and fingers 89 will be oscillated in an opening or dumping action to release an article in a flat-wise manner or direction onto the receiving conveyor.

With the foregoing structure the post 65 may rotate continually with the boom 68 lowered and the article support fingers 89 extended horizontally and closed. When it is desired to remove an article from the supply conveyor 6, the valve 76 is selectively actuated to raise the platform 75 and the boom with a resultant upward swinging and lifting motion of the article support members 87 and 89 to lift the article off of the hook 5. The pawl 78 then functions to trip the latch and lower the boom and article support to horizontal position and the pin 97 functions to trip the pawl 93 and open the support fingers 89 over the receiving support or conveyor 11.

In all three forms of the transfer device a rotating boom carries a pivotally mounted article support member and associated linkage for imparting a vertically swinging motion to the article support concurrently with upward and downward motion of the boom to effectively engage or disengage the articles to be transferred as the boom and article support move in arcuate registering relation to the hooks or supporting surfaces of the supply and receiving conveyors.

Thus any article having a flange or opening capable of being engaged over a hook on a conveyor may be effectively handled and transferred by the several forms of the transfer mechanism disclosed. A wide variety of conveyor arrangements and control systems for the transfer devices are possible but no attempt is made to illustrate these possible uses of the rotating and swinging transfer mechanism.

What is claimed as new is:

1. A transfer device for transferring articles from a first conveyor to a second conveyor, one of said conveyors having article supporting hooks, said device comprising,
    an upright post rotatably positioned between said conveyors,
    a drive connected to rotate said post in timed relation to said one conveyor,
    a boom vertically swingably pivoted on said post and projecting radially therefrom to swing toward each of said conveyors and below the level of articles advanced by the conveyors,
    a lateral link pivoted to said post and connected by an upright link to said boom for parallel motion with the boom,
    an article support base member connected to the swinging end of said boom by a horizontal pivot,
    a tilting link pivotally connected to said base member at a point spaced above the pivot between the base member and boom and pivoted to said upright link at a point spaced from the pivot between the boom and upright link whereby downward motion of the boom imparts downwardly and radially outwardly swinging motion of said base member,
    means including a roller on the bottom of said upright link and a coacting incline block fixed relative to said base to raise said boom as the boom swings past one of said conveyors,
    a latch pivoted on said post and spring biased to engage and hold said boom in raised position,
    a fixed trip element positioned to engage said latch and release the latch from the boom as the boom passes the other of said conveyors,
    and L-shaped article supporting members secured to said base member to engage and lift an article off one conveyor upon upward swinging of the base and to lower an article onto a supporting hook on the other conveyor upon downward swinging motion of the base.

2. A transfer device for transferring articles from a first conveyor to a second conveyor, one of said conveyors having article supporting hooks, said device comprising,
    an upright post rotatably positioned between said conveyors,
    a drive connected to rotate said post in timed relation to said one conveyor,
    a boom vertically swingably pivoted on said post and projecting radially therefrom to swing toward each of said conveyors and below the level of articles advanced by the conveyors,
    a lateral link pivoted to said post and connected by an upright link to said boom for parallel motion with the boom,
    an article support base member connected to the swinging end of said boom by a horizontal pivot,
    a tilting link pivotally connected to said base member at a point spaced from the pivot between the base member and boom and pivoted to said upright link at a point spaced from the pivot between the boom and upright link whereby downward motion of the boom imparts downwardly and radially outwardly swinging motion of said base member,
    means engageable with the bottom of said upright link to raise said boom as the boom swings past one of said conveyors,
    a latch pivoted on said post and spring biased to engage and hold said boom in raised position,
    a fixed trip element positioned to engage said latch and release the latch from the boom as the boom passes the other of said conveyors,
    and L-shaped article supporting members secured to said base member to engage and lift an article off one conveyor upon upward swinging of the base and to lower an article onto a supporting hook on the other conveyor upon downward swinging motion of the base.

3. A transfer device for transferring articles from a first conveyor to a second conveyor, one of said conveyors having article supporting hooks, said device comprising,
    an upright post rotatably positioned between said conveyors,
    a drive connected to rotate said post in timed relation to said one conveyor,
    a boom vertically swingably pivoted on said post and projecting radially therefrom to swing toward each of said conveyors,
    a lateral link pivoted to said post and connected by an upright link to said boom for parallel motion with the boom,
    an article support base member connected to the swinging end of said boom by a horizontal pivot,
    a tilting link pivotally connected to said base member at a point spaced above the pivot between the base member and boom and pivoted to said upright link at a point spaced below the pivot between the boom and upright link whereby downward motion of the boom imparts downwardly and radially outwardly swinging motion of said base member,
    means including a roller on the bottom of said upright link and a coacting incline block fixed relative to said base to raise said boom as the boom swings past one of said conveyors,
    a latch pivoted on said post and spring biased to engage and hold said boom in raised position,
    a fixed trip element positioned to engage said latch and release the latch from the boom as the boom passes the other of said conveyors, and L-shaped article supporting members secured to said base member to engage and lift an article off one conveyor upon upward swinging of the base and to lower an article onto a supporting hook on the other conveyor upon downward swinging motion of the base, said supporting members being approximately horizontal in the lower position of the boom and generally upright in the raised position of the boom.

4. A transfer device for transferring articles from a first conveyor to a second conveyor, one of said conveyors having article supporting hooks, said device comprising, an upright post rotatably positioned between said conveyors, a drive connected to rotate said post in timed relation to said one conveyor, a boom vertically swingably pivoted on said post and projecting radially therefrom to swing toward each of said conveyors, a lateral link pivoted to said post and connected by an upright link to said boom for parallel motion with the boom, an article support base member connected to the swinging end of said boom by a horizontal pivot, a tilting link pivotally connected to said base member at a point spaced from the pivot between the base member and boom and pivoted to said upright link at a point spaced from the pivot between the boom and upright link whereby downward motion of the boom imparts downwardly and radially outwardly swinging motion of said base member, means acting to raise said boom as the boom swings past one of said conveyors, means arranged to hold said boom in raised position through part of its rotation and lower the boom as the boom passes the other of said conveyors, and L-shaped article supporting members secured to said base member to engage and lift an article off one conveyor upon upward swinging of the base and to lower an article onto a supporting hook on the other conveyor upon downward swinging motion of the base, said supporting members being approximately horizontal in the lower position of the boom and generally upright in the raised position of the boom.

5. A transfer device for transferring articles from a first conveyor to a second conveyor, one of said conveyors having article supporting hooks, said device comprising, an upright post rotatably positioned between said conveyors, a drive connected to rotate said post in timed relation to said one conveyor, a boom vertically swingably pivoted on said post and projecting radially therefrom to swing toward each of said conveyors, a lateral link pivoted to said post and connected by an upright link to said boom for parallel motion with the boom, an article support base member connected to the swinging end of said boom by a horizontal pivot, a tilting link pivotally connected to said base member at a point spaced from the pivot between the base member and boom and pivoted to said upright link at a point spaced from the pivot between the boom and upright link whereby downward motion of the boom imparts downwardly and radially outwardly swinging motion of said base member, means acting to raise said boom as the boom swings past one of said conveyors, means arranged to hold said boom in raised position through part of its rotation and lower the boom as the boom passes the other of said conveyors, and article supporting members secured to said base member to engage and lift an article off one conveyor upon upward swinging of the base and to lower an article onto a supporting hook on the other conveyor upon downward swinging motion of the base, said supporting members being approximately horizontal in the lower position of the boom and generally upright in the raised position of the boom, said support members being separately pivoted on said base member and being connected to a trip pawl on said base member to open downwardly and outwardly when the trip member is actuated.

6. A transfer device for transferring articles from a first conveyor to a second conveyor, one of said conveyors having article supporting hooks, said device comprising, an upright post rotatably positioned between said conveyors, a drive connected to rotate said post in timed relation to said one conveyor, a boom vertically swingably pivoted on said post and projecting radially therefrom to swing toward each of said conveyors, a lateral link pivoted to said post and connected by an upright link to said boom for parallel motion with the boom, an article support base member connected to the swinging end of said boom by a horizontal pivot, a tilting link pivotally connected to said base member at a point spaced from the pivot between the base member and boom and pivoted to said upright link at a point spaced from the pivot between the boom and upright link whereby downward motion of the boom imparts downwardly and radially outwardly swinging motion of said base member, means arranged to raise said boom as the boom swings past the first of said conveyors, means arranged to hold said boom in raised position after passing said first conveyor, said boom supporting means being arranged to lower the boom as the boom passes the other of said conveyors, L-shaped article supporting members secured to said base member to engage and lift an article off said one conveyor upon upward swinging of the base and to lower an article onto a supporting hook on the other conveyor upon downward swinging motion of the base, said article supporting members being mounted on pivots extending radially of said base member, and trip members connected to said supporting members and engageable with a pawl adjacent said second conveyor to swing the support members downwardly in article releasing direction.

7. A transfer device for transferring articles from a conveyor to a receiving support, said conveyor having article supporting hooks, said device comprising, an upright post rotatably positioned between said conveyor and said support, a drive connected to rotate said post in timed relation to said conveyor, a boom vertically swingably pivoted on said post and projecting radially therefrom to swing toward each of said conveyor and said support, a lateral link pivoted to said post and connected by an upright link to said boom for parallel motion with the boom, an article support base member connected to the swinging end of said boom by a horizontal pivot, a tilting link pivotally connected to said base member at a point spaced from the pivot between the base member and boom and pivoted to said upright link at a point spaced from the pivot between the boom and upright link whereby downward motion of the boom imparts downwardly and radially outwardly swinging motion of said base member, means arranged to raise said boom as the boom swings past said conveyor, means arranged to hold said boom in raised position after passing said conveyor, said boom supporting means being arranged to lower the boom as the boom passes said receiving support, article supporting members secured to said base member to engage and lift an article off said one conveyor upon upward swinging of the base and to lower an article to said receiving support upon downward swinging motion of the base, said article supporting members being mounted on pivots extending radially of said base member, and trip members connected to said supporting members and engageable with a pawl adjacent said receiving support to swing the support members downwardly in article releasing direction.

8. In an article transfer device for transferring articles to a conveyor having article suspending hooks, the combination of an upright post rotatably positioned alongside of said conveyor, a boom pivoted on said post and projecting therefrom, a drive connected to rotate said post and synchronized with said conveyor to rotate said boom into projecting relation toward hooks advanced on said conveyor, means engageable with said boom in one rotated position thereof to raise the boom, a latch engageable with said boom to hold the boom in raised position, a trip member engageable with said latch to disengage the latch from the boom when the boom is adjacent said conveyor to lower the boom, an article holder base member pivoted to the swinging end of said boom by a horizontal pivot, links pivotally connected between said post and said base member to swing said base member downwardly and radially outwardly relative to said post as said boom is lowered, and article supporting members carried by said base member and projecting therefrom.

9. In an article transfer device for transferring articles from a conveyor having article suspending hooks, the combination of an upright post rotatably positioned alongside of said conveyor, a boom pivoted on said post and projecting therefrom, a drive connected to rotate said post and synchronized with said conveyor to rotate said boom into projecting relation toward hooks advanced on said conveyor, means engageable with said boom in one rotated position thereof to raise the boom, a latch engageable with said boom to hold the boom in raised position, a trip member engageable with said latch to disengage the latch from the boom when the boom is remote from said conveyor to lower the boom, an article holder base member pivoted to the swinging end of said boom by a horizontal pivot, links pivotally connected between said post and said base member to swing said base member downwardly and radially outwardly relative to said post as said boom is lowered, and article supporting members carried by said base member and projecting therefrom.

10. An article transfer device comprising a horizontally pivoted boom, a rotatable support connected to rotate said boom and its pivot in a horizontal arc, lift means arranged to raise the swinging end of said boom in one rotated position thereof, support means engageable with said boom and arranged to lower the boom in another rotated position thereof, an article support base member pivotally mounted on the end of said boom on a horizontal pivot, linkage connected to said base member remotely from its pivotal connection to said boom and connected to said post to impart reverse swinging motion to said base member relative to said boom in response to upward and downward motion of said boom, and article supporting parts secured to said base member and shaped to support an article in all tilted positions of said base member.

References Cited in the file of this patent

UNITED STATES PATENTS

| 2,207,179 | Schreiber | July 9, 1940 |
| 2,431,320 | Fischer | Nov. 25, 1947 |
| 2,949,996 | Tonelli | Aug. 23, 1960 |